UNITED STATES PATENT OFFICE.

OTTO ERNST AND GILLIS GULLBRANSSON, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

MONOAZO DYE FOR LAKES AND PROCESS OF MAKING SAME.

No. 858,065.     Specification of Letters Patent.     Patented June 25, 1907.

Application filed March 26, 1907. Serial No. 364,589.

*To all whom it may concern:*

Be it known that we, OTTO ERNST, Ph. D., and GILLIS GULLBRANSSON, chemists, respectively citizens of the Empire of Germany and of the Kingdom of Sweden, residing at Höchst-on-the-Main, Germany, have invented certain new and useful Improvements in Making a Monoazo Dyestuff Suitable for the Preparation of Dye-Lakes, of which the following is a specification.

Among the various azo dyestuffs suitable for the preparation of red dye lakes only very few dyestuffs come into consideration as regards obtaining decidedly bluish red shades of great purity in tint and good properties of fastness, especially if sufficient alowance is to be made for other requirements of the lake-dye industry.

It has been found that the monoazo dyestuff from beta-oxynaphthoic acid-2:3 (melting point 216° C.) with 2-diazo-naphthaline-1-sulfonic acid yields dye-lakes of special value. These lakes possess great tinctorial power having a bluish tint which as regards purity has not been obtained with other dyestuffs. Thus, for instance, the dyestuff from 2-naphthylamine-1-sulfonic acid (diazot.) + beta-naphthol, not containing the carboxylic group, yields according to U. S. Patent No. 650757 much redder lakes, which cannot come into consideration respecting the manufacture of blue-red shades. Besides, the dyestuff from oxynaphthoic acid compared to that from beta-naphthol has the advantage of greater fastness to light when applied as chalk lake. From ponceau 4RL yielding similarly dyed lakes, the beta-oxynaphthoic acid dyestuff is distinguished by greater tinctorial power. The fastness of the lakes to water is absolute, in spite of the presence of 2 groups forming salts, the sulfonic- and carboxylic group; the fastness to light is also very good. The lakes are particularly valuable for book- and tin-printing, lithography and painting in oil.

The new dyestuff may be obtained, for instance, as follows:—24,5 parts of sodium beta-naphthylaminesulfonate 2:1 are dissolved in a little more than the equivalent proportion of sodium nitrite in the requisite quantity of water. The solution kept cool is run into cold dilute hydrochloric acid, containing somewhat more than 2 equivalents of hydrochloric acid, so that on completion of the diazotation an excess of acid is still present and nitrous acid distinctly traceable. The diazo solution thus obtained is slowly run into a solution of 20 parts of beta-oxynaphthoic acid 2:3 (M. P. 216°), obtained with the requisite quantity of water, of 25 parts of soda-lye of 40° Bé specific gravity and about 6 parts of calcined soda. The formation of the dyestuff is complete within a short time. The red dyestuff, completely separated in most cases is isolated in the usual manner and preferably employed in form of a paste in the preparation of lakes; it may, however, also be obtained in form of a powder as its solubility in water is sufficient.

Having now described our invention, what we claim is:—

1. The herein described process for the manufacture of a monoazo dyestuff specially suitable for preparing blue-red color-lakes, which consists in combining 2-diazonaphthaline-1-sulfonic acid with oxynaphthoic acid-2:3, melting point 216° C.

2. As new product, the dyestuff obtained by combining 2-diazonaphthaline-1-sulfonic acid with beta-oxynaphthoic acid-2:3, being a dark red powder of which the aqueous solution is red; in concentrated sulfuric acid the solution in a thin layer is of a blue red shade; on addition of water the free acid of the dyestuff separates as a red brown precipitate; in alcohol the dyestuff is insoluble.

In testimony, that we claim the foregoing as our invention, we have signed our names in presence of two subscribing witnesses.

OTTO ERNST.
    GILLIS GULLBRANSSON.

Witnesses:
    JEAN GRUND,
    CARL GRUND.